C. J. WALDEN.
METHOD OF SEPARATING SKINS FROM VEGETABLES AND FRUITS.
APPLICATION FILED NOV. 21, 1921.
1,438,467.
Patented Dec. 12, 1922.
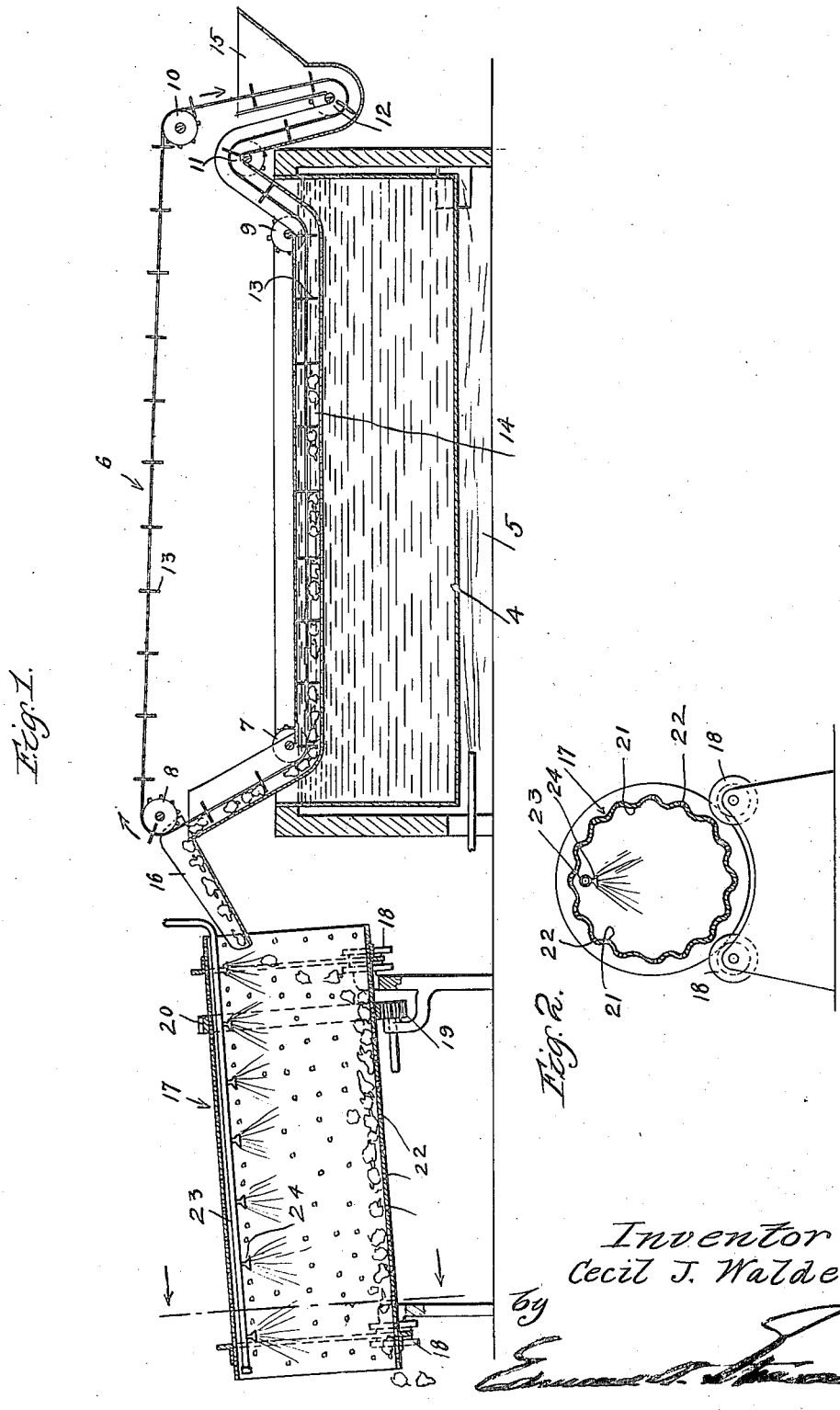
Inventor
Cecil J. Walden Patented Dec. 12, 1922.

1,438,467

UNITED STATES PATENT OFFICE.

CECIL J. WALDEN, OF LOS ANGELES, CALIFORNIA.

METHOD OF SEPARATING SKINS FROM VEGETABLES AND FRUITS.

Application filed November 21, 1921. Serial No. 516,669.

*To all whom it may concern:*

Be it known that I, CECIL J. WALDEN, a citizen of the United States, residing at Los Angeles, in the county of Los Angeles and State of California, have invented new and useful Improvements in the Methods of Separating Skins from Vegetables and Fruits, of which the following is a specification.

My invention relates to the method of separating or loosening the skin from vegetables and fruits, and is particularly adapted for the blistering and separating or loosening of the skins from the flesh of peppers, chilis, pimientos and other vegetables of a like nature.

In packing plants and canneries it has heretofore generally been the custom to subject the chili peppers to a dry roasting process in order to blister the skins thereon. By the use of this roasting process it has been difficult to apply a uniform heat to the entire surface of the product and as a consequence the skin has not been uniformly blistered, and when the products are taken from the roaster a large proportion of the skin still adheres to the flesh and has to be removed by hand, thereby incurring additional expense; moreover, during this roasting process parts of some of the chilis become burned and damaged, and gas forms in some of them and causes them to burst, thus disintegrating the flesh and rendering it unfit for canning purposes.

It is the object of my invention to overcome the above recited difficulties by providing a method whereby the product will be subjected to a moist heat to scald it uniformly throughout its area, thus blistering the skin uniformly and separating or loosening it from the flesh without disintegrating, burning or scorching the same.

In order to accomplish the above object I completely submerge the chilis or other vegetable products of a like nature in a bath of heated oil, preferably of a neutral or tasteless nature, such as cotton seed, or olive oil, which is heated to a temperature above the boiling point and permitting the product to remain in said bath until the skin becomes thoroughly blistered and substantially separated or loosened from the flesh, but not for such a duration of time as to cook or otherwise affect the character of the flesh of the vegetable.

As far as I have been able to determine, oil has been found to be better suited than any other liquid for this purpose, especially as it is possible to raise the temperature of oil to an extremely high degree of temperature.

I have found that by heating the oil so that it attains a temperature of approximately 380-degrees Fahrenheit extremely satisfactory results are obtained, especially in connection with the blistering of the skins of pimientos, chilis and like vegetables which are extremely tough and non-porous in their nature.

After the chili peppers have been removed from the highly heated oil bath in which they have been treated, I have found that by subjecting the peppers to a rubbing action the loosened and broken skins will readily fall away from the fruit, the rubbing action being supplemented and assisted by an application of cold water in the form of a spray applied to the peppers simultaneously with the rubbing action, the cold water having a tendency to contract the flesh or meat of the peppers, so that the skins will be readily detached or washed therefrom by the force of the spray of water.

The accompanying drawings illustrate diagrammatically a convenient form of apparatus that may be employed in carrying out my invention.

Fig. 1 represents in longitudinal section an apparatus diagrammatic in form of conveniently practising my invention.

Fig. 2 is a transverse section taken on the line 2—2 of Fig. 1.

Referring to Fig. 1, 4 represents a vat of suitable length, breadth and depth which is supported in masonry in such manner as to form a fire box 5 provided with an oil burner disposed in said fire box and under said vat for the heating of a body of oil contained therein. Mounted above the vat 4 and adapted to travel longitudinally therewith is an endless chain belt conveyor 6, which passes over the sprocket wheels 7 and 8 at its discharge end, and the sprocket wheels 9, 10, 11 and 12 at its receiving end, said chain belt being adapted to be driven by means of the sprocket wheel 8 in the direction indicated by the arrow.

The chain belt 6 is provided with suitable flights 13 which pass through the body of the oil in the vat, and in order that the products may be prevented from floating and that their entire area will at all times be immersed in the oil, a conduit 14, provided with a perforated top, through which the chain belt passes, is mounted in said tank and immersed in said oil.

The conveyor belt 6 passes through a supply hopper 15 to receive the products and discharges the same in a blistered condition on to a chute 16, which projects into an agitating drum 17; said drum being supported on the rollers 18 and adapted to be revolved by means of the pinion 19, geared to any source of power, which meshes with the gear ring 20 secured to the peripheral surface of said drum.

The drum 17 is provided with longitudinally disposed ribs or flutes 21 and the wall thereof is provided with a plurality of perforations 22 in order that said drum and the products therein may be properly drained.

Arranged to pass longitudinally through the drum 17 and disposed adjacent the top thereof, is a water supply pipe 23 adapted to be held stationary and provided with a plurality of sprinkler heads 24 adapted to spray water downwardly on to the products contained in said drum.

In the operation of the apparatus, the oil in the vat 4 is heated and kept at a uniform desired temperature by means of the flame from the oil burner disposed therebelow. Motion, in the direction indicated by the arrow, is imparted to the conveyor, which conveys the peppers deposited in the hopper 15, through the heated oil. The speed of the conveyor is proportioned to the temperature of the oil, in order that the chilis will become thoroughly blistered, but not burned or cooked, during their passage through the vat 4 from its receiving end to its discharge end.

The scalded chilis drop from the chute 16 into the drum 17 which is caused to revolve by mechanism previously described, and are agitated, tumbled and rubbed together as they pass through said drum, and at the same time cold water is sprayed upon them, thus breaking and completely separating or loosening the skin from the flesh of the chilis without destroying or blemishing said flesh.

By the foregoing method of treating the chilis, it will be seen that their entire area is subjected to a uniform heat to blister the skin uniformly therefrom, and that all danger of gases forming in the product to cause the same to burst is avoided, and that all danger of the flesh becoming scorched or burned will be avoided. Moreover the skins will become more uniformly separated or loosened and peeled from the flesh, thus eliminating the necessity of performing a part of this operation by operators.

By employing a tasteless oil in the carrying out of my method, I have found that all of the natural characteristics of the flesh of the product is preserved and that all danger of the flesh becoming scorched or dried is avoided.

What I claim is:

1. The method of separating the skins from vegetables and fruits, comprising immersing them in heated oil.

2. The method of separating the skins from vegetables and fruit, comprising immersing them in oil heated to a temperature of approximately 380 degrees Fahrenheit.

3. The method of separating the skins from vegetables and fruit, comprising immersing them in a heated neutral oil.

4. The method of separating the skins from vegetables and fruit, comprising passing them through a body of boiling neutral oil to blister the skin thereon.

5. The method of separating the skins from vegetables and fruit, comprising initially blistering the skin thereof by immersing them in heated oil, and then subjecting them to a rubbing process.

6. The method of separating the skins from vegetables and fruit, comprising initially blistering the skins thereof by immersing them in heated oil, and then subjecting them to a rubbing action and a bath of water to remove the loosened or blistered skins.

7. The method of separating the skins from vegetables and fruit, comprising initially blistering the skins thereof by passing them through and submerging them in a vat of heated oil, then agitating the mass of blistered products to break and separate the skins from the products and at the same time subjecting them to a bath of water.

In witness that I claim the foregoing I have hereunto subscribed my name this 31st day of October, 1921.

C. J. WALDEN.